US012087311B2

(12) United States Patent
Keiler et al.

(10) Patent No.: US 12,087,311 B2
(45) Date of Patent: *Sep. 10, 2024

(54) METHOD AND APPARATUS FOR ENCODING AND DECODING AN HOA REPRESENTATION

(71) Applicant: DOLBY LABORATORIES LICENSING CORPORATION, San Francisco, CA (US)

(72) Inventors: Florian Keiler, Hannover (DE); Sven Kordon, Wunstorf (DE); Alexander Krueger, Hannover (DE)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 585 days.

This patent is subject to a terminal disclaimer.

(21) Appl. No.: 17/353,711

(22) Filed: Jun. 21, 2021

(65) Prior Publication Data

US 2021/0390964 A1 Dec. 16, 2021

Related U.S. Application Data

(60) Continuation of application No. 16/709,519, filed on Dec. 10, 2019, now Pat. No. 11,043,224, which is a (Continued)

(30) Foreign Application Priority Data

Jul. 30, 2015 (EP) .................................... 15306236

(51) Int. Cl.
*G10L 19/08* (2013.01)
*G10L 19/008* (2013.01)
(Continued)

(52) U.S. Cl.
CPC ............ *G10L 19/008* (2013.01); *H04S 3/008* (2013.01); *H04S 3/02* (2013.01); *H04S 2420/11* (2013.01)

(58) Field of Classification Search
CPC ......... G10L 19/008; H04S 3/008; H04S 3/02; H04S 2420/11
See application file for complete search history.

(56) References Cited

U.S. PATENT DOCUMENTS 9,495,968 B2 11/2016 Sen
9,961,475 B2 * 5/2018 Kim .......................... H04S 3/02
(Continued)

FOREIGN PATENT DOCUMENTS

EP 2469741 6/2012
EP 2469742 6/2012
(Continued)

OTHER PUBLICATIONS

Integration Nodes for the Sphere, 2015, http://www.mathematik.uni-dortmund.de/lsx/research/projects/fliege/nodes/nodes.html.
(Continued)

*Primary Examiner* — Abul K Azad

(57) ABSTRACT

The present invention relates to methods and apparatus for encoding an HOA signal representation (c(t)) of a sound field having an order of N and a number $O=(N+1)^2$ of coefficient sequences to a mezzanine HOA signal representation ($w_{MEZZ}(t)$). The present invention further relates to methods and apparatus for decoding a reconstructed HOA signal representation from the mezzanine HOA signal representation.

12 Claims, 3 Drawing Sheets

Related U.S. Application Data division of application No. 16/457,501, filed on Jun. 28, 2019, now Pat. No. 10,515,645, which is a division of application No. 15/747,022, filed as application No. PCT/EP2016/068203 on Jul. 29, 2016, now Pat. No. 10,468,037.

(51) Int. Cl.

*H04S 3/00* (2006.01)
*H04S 3/02* (2006.01)

(56) References Cited

U.S. PATENT DOCUMENTS

| | | | | |
|---|---|---|---|---|
| 10,468,037 | B2 * | 11/2019 | Keiler | G10L 19/008 |
| 10,515,645 | B2 * | 12/2019 | Keiler | H04S 3/008 |
| 10,593,343 | B2 * | 3/2020 | Liu | H04S 3/008 |
| 11,043,224 | B2 * | 6/2021 | Keiler | G10L 19/008 |
| 2012/0155653 | A1 | 6/2012 | Jax | |
| 2014/0016802 | A1 | 1/2014 | Sen | |
| 2014/0219456 | A1 | 8/2014 | Morrell | |
| 2015/0154965 | A1 | 6/2015 | Wuebbolt | |
| 2015/0223004 | A1 | 8/2015 | Deprez | |
| 2015/0230040 | A1 | 8/2015 | Squires | |
| 2015/0332682 | A1 * | 11/2015 | Kim | G10L 19/008 381/23 |
| 2015/0340044 | A1 | 11/2015 | Kim | |
| 2016/0064005 | A1 | 3/2016 | Peters | |
| 2016/0241980 | A1 | 8/2016 | Najaf-Zadeh | |

FOREIGN PATENT DOCUMENTS

| | | |
|---|---|---|
| EP | 2824661 | 1/2015 |
| WO | 2013171083 | 11/2013 |
| WO | 2014012945 | 1/2014 |
| WO | 2014090660 | 6/2014 |
| WO | 2014177455 | 11/2014 |

OTHER PUBLICATIONS

ISO/IEC JTC 1/SC29 “Information Technology—High Efficiency Coding and Media Delivery in Heterogenous Environments—Part 3: 3D Audio” Jul. 25, 2014.

ISO/IEC JTC1/SC29/WG11 N14264, “WD1-HOA Text of MPEG-H 3D Audio” Coding of Moving Pictures and Audio, Jan. 2014, pp. 1-86.

Jerome Daniel, “Representation de Champs Acoustiques, application a la transmission et a la reproduction de scenes Sonores Complexes dans un Context Multimedia” Jul. 31, 2001.

Rafaely, Boaz “Plane Wave Decomposition of the Sound Field on a Sphere by Spherical Convolution” ISVR Technical Memorandum 910, May 2003, pp. 1-40.

Williams, Earl, “Fourier Acoustics” Chapter 6 Spherical Waves, pp. 183-186, Jun. 1999.

* cited by examiner

METHOD AND APPARATUS FOR ENCODING AND DECODING AN HOA REPRESENTATION

CROSS REFERENCE TO RELATED APPLICATIONS

This application is a continuation of U.S. application Ser. No. 16/709,519, filed Dec. 10, 2019, which is a divisional of U.S. application Ser. No. 16/457,501, filed Jun. 28, 2019, which issued as U.S. Pat. No. 10,515,645 on Dec. 24, 2019, which is a divisional of U.S. application Ser. No. 15/747,022, filed Jan. 23, 2018, which issued as U.S. Pat. No. 10,468,037 on Nov. 5, 2018, which is U.S. National Stage of International Application No. PCT/EP2016/068203, filed Jul. 29, 2016, which claims priority to European Patent Application No. 15306236.9, filed Jul. 30, 2015, each of which is incorporated by reference in its entirety.

TECHNICAL FIELD

The invention relates to a method and to an apparatus for generating from an HOA signal representation a mezzanine HOA signal representation having an arbitrary non-quadratic number of virtual loudspeaker signals, and to the corresponding reverse processing.

BACKGROUND

There are a variety of representations of three dimensional sound including channel-based approaches like 22.2, object based approaches and sound field oriented approaches like Higher Order Ambisonics (HOA). In general, each representation offers its special advantages, be it at recording, modification or rendering. For instance, rendering of an HOA representation offers the advantage over channel based methods of being independent of a specific loudspeaker set-up. This flexibility, however, is at the expense of a rendering process which is required for the playback of the HOA representation on a particular loudspeaker set-up. Regarding the modification of three dimensional sound, object-based approaches allow a very simple selective manipulation of individual sound objects, which may comprise changes of object positions or the complete exchange of sound objects by others. Such modifications are very complicated to be accomplished with channel-based or HOA-based sound field representations.

HOA is based on the idea of equivalently representing the sound pressure in a sound source-free listening area by a composition of contributions from general plane waves from all possible directions of incidence. Evaluating the contributions of all general plane waves to the sound pressure in the centre of the listening area, i.e. the coordinate origin of the used system, provides a time and direction dependent function, which is then for each time instant expanded into a series of Spherical Harmonics functions. The weights of the expansion, regarded as functions over time, are referred to as HOA coefficient sequences, which constitute the actual HOA representation. The HOA coefficient sequences are conventional time domain signals with the specialty of having different value ranges among themselves. In general, the series of Spherical Harmonics functions comprises an infinite number of summands, whose knowledge theoretically allows a perfect reconstruction of the represented sound field. In practice, for arriving at a manageable finite amount of signals, that series is truncated, resulting in a representation of a certain order N, which determines the number O of summands for the expansion given by $O=(N+1)^2$. The truncation affects the spatial resolution of the HOA representation, which obviously improves with a growing order N. Typical HOA representations using order N=4 consist of O=25 HOA coefficient sequences.

SUMMARY OF INVENTION

In the context of video and audio production the traditionally used sound field representations have been purely channel-based (with a relatively low number of channels) for a long time. One prominent interface for the transport, processing and storage of video and accompanying audio signals in uncompressed or lightly compressed form has been the Serial Digital Interface (SDI), where the audio part is typically represented by 16 channels in Pulse Code Modulation (PCM) format. In order to profit from the previously mentioned advantages of individual sound field representations of three-dimensional sound, there is a trend to use a combination of them already at the production stage. For instance, the Dolby Atmos system uses a combination of channel- and object-based sound representations. Especially for financial reasons, it is greatly desired to reuse the existing infrastructure and interfaces, and in particular the SDI, for the transport and storage of the combination of the individual sound field representations. If HOA is desired to be part of the combined sound field representations, there arises the need for a mezzanine HOA format, where in contrast to the conventional HOA format the sound field is not represented by a square of an integer number of HOA coefficient sequences with different value ranges, but rather by a limited number I of conventional time domain signals, all of which having the same value range (typically $[-1,1[$) and where I is not necessarily a square of an integer number. A further requirement on such HOA mezzanine representation is that it is to be computable from the conventional one (i.e. the representation consisting of HOA coefficient sequences) sample-wise without any latency, in order to allow cutting and joining of audio files at arbitrary time positions. This is relevant for broadcasting scenarios for allowing the instantaneous insertion of commercials consisting of video and audio into the running broadcast.

FIG. 1 illustrates the embedding of an object-based sound field representation 10 and a conventional HOA sound field representation c(t) into a multi-channel PCM signal representation consisting of $I_{TRANSP}$ transport channels. In the SDI system the value of $I_{TRANSP}$ is equal to 16. The object-based sound field representation 10 is assumed to be already given in a multi-channel PCM format consisting of $I_{OBJ}\geq 0$ channels. The conventional HOA representation c(t) consisting of O coefficient sequences (see the definition in section Basics of Higher Order Ambisonics) is first transformed in a transforming step or stage 11 into a mezzanine HOA representation $w_{MEZZ}(t)$ consisting of $I=I_{TRANSP}-I_{OBJ}$ PCM signals. Finally, both the object based sound field representation 10 and the mezzanine HOA representation are multiplexed in a multiplexer step or stage 12, which outputs the multi-channel PCM signal representation consisting of $I_{TRANSP}$ transport channels.

The reverse operation, i.e. the reconstruction of a combination of object based and HOA sound field representation from a multi-channel PCM representation consisting of $I_{TRANSP}$ channels, is exemplarily shown in FIG. 2. The multi-channel PCM signal representation is de-multiplexed in a de-multiplexer step or stage 22 in order to provide a mezzanine HOA representation consisting of $I=I_{TRANSP}-I_{OBJ}$ PCM signals and an object based sound field based representation 20 in a multi-channel PCM format consisting of $I_{OBJ} \geq 0$ channels. The mezzanine HOA representation is then transformed back in an inverse-transforming step or stage 21 to the conventional HOA representation c(t) consisting of O HOA coefficient sequences.

Instead of an object based sound field based representation any other representations can be used, e.g. a channel based representation or a combination of sound field based and channel based representation.

Advantageously, the processing or circuitry in FIG. 1 and FIG. 2 can be used for converting the sound field representations to the appropriate format as required by already existing audio infrastructure and interfaces.

In the following, the transform from conventional HOA representation to the HOA mezzanine representation in FIG. 1 and the corresponding inverse transform in FIG. 2 are described in detail.

In one example, the present invention relates to methods, computer readable mediums and apparatus for encoding an ambisonics signal representation of a sound field having an order N to determine a mezzanine ambisonics signal representation. A first receiver and/or a processor may receive a first multi-channel signal comprising a first number of channels O, wherein O=(N+1)^2, wherein the O channels represent O Higher Order Ambisonics (HOA) coefficient sequences, and wherein the ambisonics signal representation is represented by the first multi-channel signal. The processor and/or a second receiver may receive transforming information for encoding the first multi-channel signal of the ambisonics signal representation, wherein the transforming information includes mapping information for mapping the O HOA coefficient sequences to O virtual loudspeaker signals. The processor and/or a processing unit may transform the first multi-channel signal to a second multi-channel signal based on the transforming information, wherein the mezzanine ambisonics signal representation is represented by the second multi-channel signal, and wherein the second multi-channel signal comprises a second number of channels I, and wherein the I channels represent I groups of virtual loudspeaker signals. The transforming information may include information regarding a decoding matrix V. The transforming information may include information regarding an encoding matrix V+ that is a pseudo inverse of the decoding matrix V. The grouping information may indicate groups of two virtual loudspeakers.

Another example relates to methods, computer readable medium, and apparatus for decoding a mezzanine ambisonics signal representation to determine a reconstructed ambisonics signal representation of a sound field having an order N, the method comprising. A first receiver and/or a processor may be configured to receive a first multi-channel signal of the mezzanine ambisonics signal representation, the first multi-channel signal of the mezzanine ambisonics signal representation having a first number of channels I. A second receiver and/or the processor may be configured to receive transforming information for decoding the first multi-channel signal of the mezzanine ambisonics signal representation, wherein the transforming information includes information for mapping O number of virtual loudspeakers to O sequences of Higher Order Ambisonics (HOA) coefficient sequences that represent the reconstructed ambisonics signal representation. The processor and/or a processing unit may further be configured to transform the first multi-channel signal to a second multi-channel signal based on the transforming information, wherein the second multi-channel signal represents the reconstructed ambisonics signal representation, wherein the second multi-channel signal comprises O channels, wherein O=(N+1)^2, and wherein the transforming includes de-grouping the I channels to O de-grouped channels. The transforming information may include information regarding an encoding matrix V+. The transforming information may include information regarding a decoding matrix V that is a pseudo inverse of the encoding matrix V+. The de-grouping information may indicate groups of two virtual loudspeakers.

Spatial HOA Encoding

A kind of mezzanine HOA format is obtained by applying to the conventional HOA coefficient sequences a 'spatial' HOA encoding, which is an intermediate processing step in the compression of HOA sound field representations used in MPEG-H 3D audio, cf. section C.5.3 in [1]. The idea of spatial HOA encoding, which was initially proposed in [8], [6], [7], is to perform a sound field analysis and decompose a given HOA representation into a directional component and a residual ambient component. On one hand, this intermediate representation is assumed to consist of conventional time-domain signals representing e.g. general plane wave functions and of relevant coefficient sequences of the ambient HOA component. Both types of time domain signals are ensured to have the value range [−1,1[ by the application of a gain control processing unit. On the other hand, this intermediate representation will comprise additional side information which is necessary for the reconstruction of the HOA representation from the time-domain signals.

In general, the spatial HOA encoding is a lossy transform, and the quality of the resulting representation highly depends on the number of time-domain signals used and on the complexity of the sound field. The sound field analysis is carried out frame-wise, and for the decomposition overlap-add processing is employed in order to obtain continuous signals. However, both operations create a latency of a least one frame, which is not in accordance with the above mentioned requirement of without-latency. A further disadvantage of this format is that side information cannot be directly transported over the SDI, but has to be converted somehow to the PCM format. Since the side information is frame-based, its converted PCM representation obviously cannot be cut at arbitrary sample positions, which severely complicates a cutting and joining of audio files.

Spatial Transform

A further mezzanine format is represented by 'equivalent spatial domain representation', which is obtained by rendering the original HOA representation c(t) (see section Basics of Higher Order Ambisonics for definition, in particular equation (35)) consisting of O HOA coefficient sequences to the same number O of virtual loudspeaker signals $w_j(t)$, $1 \leq j \leq 0$ representing general plane wave signals. The order dependent directions of incidence $\Omega_j^{(N)}$, $1 \leq j \leq O$, may be represented as positions on the unit sphere (see also section Basics of Higher Order Ambisonics for the definition of the spherical coordinate system), on which they should be distributed as uniformly as possible (see e.g. [3] on the computation of specific directions).

For describing the rendering process in detail, initially all virtual loudspeaker signals are summarised in a vector as $$W(t) := [w_1(t) \ldots w_O(t)]^T, \quad (1)$$

where $(\bullet)^T$ denotes transposition. Denoting the scaled mode matrix with respect to the virtual directions $\Omega_j^{(N)}$, $1 \leq j \leq O$, by $\Psi$, which is defined by $$\Psi := K \cdot [S_1 \ldots S_O] \in \mathbb{R}^{O \times O} \quad (2)$$

with $$S_j:=[S_0^0(\Omega_j^{(N)})S_1^{-1}(\Omega_j^{(N)})S_1^0(\Omega_j^{(N)})S_1^1(\Omega_j^{(N)}) \ldots S_N^{N-1}(\Omega_j^{(N)})S_N^N(\Omega_j^{(N)})]^T, \quad (3)$$

and K>0 being an arbitrary positive real-valued scaling factor, the rendering process can be formulated as a matrix multiplication $$w(t)=\Psi^{-1}\cdot c(t), \quad (4)$$

where $\Psi^{-1}$ is the corresponding inverse mode matrix.

The rendering is accomplished sample-wise, and hence it does not introduce any latency. Further, it is a lossless transform, and the original HOA representation may be computed from the virtual loudspeaker signals by $$c(t)=\Psi w(t). \quad (5)$$

Because the order-dependent directions are assumed to be fixed, there is no side information required.

This transform has been proposed in [4] as a pre-processing step for the compression of HOA representations. Also, the spatial domain has been recommended for the normalisation of HOA representations as a pre-processing step for the compression according to the MPEG-H 3D audio standard [1] in section C.5.1, and in [5] where it is explicitly desired to have the same value range of [−1,1[ for all virtual loudspeaker signals.

A main disadvantage of the spatial transform is that the number of virtual loudspeaker signals is restricted to squares of integers, i.e. to $O=(N+1)^2$ with $N\in\mathbb{N}$.

It is additionally noted that the spatial transform is sometimes somehow differently formulated by replacing the inverse of the mode matrix by its transpose for equations (4) and (5). However, the difference between the two versions is only minor. In fact, both versions are identical in case the virtual directions are distributed uniformly on the unit sphere, which is e.g. possible for O=4 directions. In case the virtual directions are distributed on the unit sphere only nearly uniformly, which usually is the case, the mode matrix is only approximately a scaled orthogonal one, such that the two spatial transform versions are only approximately equal.

A problem to be solved by the invention is to provide a mezzanine HOA format computed by a modified version of a conventional HOA representation consisting of O coefficient sequences to an arbitrary number I of virtual loudspeaker signals.

Advantageous additional embodiments of the invention are disclosed in the respective dependent claims.

From an HOA signal representation c(t) of a sound field having an order of N and a number $O=(N+1)^2$ of coefficient sequences a mezzanine HOA signal representation $w_{MEZZ}(t)$ is generated that consists of an arbitrary number I<O of virtual loudspeaker signals $w_{MEZZ,1}(t)$, $w_{MEZZ,2}(t)$, . . . , $w_{MEZZ,I}(t)$. O directions are computed, or looked-up from a stored table, which are nearly uniformly distributed on the unit sphere. The mode vectors with respect to these directions are linearly weighted for constructing a matrix, of which the pseudo-inverse is used for multiplying the HOA signal representation c(t) in order to form the mezzanine HOA signal representation $w_{MEZZ}(t)$.

In principle, the method is adapted for generating, from an HOA signal representation c(t) of a sound field having an order of N and a number $O=(N+1)^2$ of coefficient sequences, a mezzanine HOA signal representation $w_{MEZZ}(t)$ consisting of an arbitrary number I<O of virtual loudspeaker signals $w_{MEZZ,1}(t)$, $w_{MEZZ,2}(t)$, . . . , $w_{MEZZ,I}(t)$, said method including:

determining a desired number I of virtual loudspeaker signals in said mezzanine HOA signal representation with I<O;

taking O directions $\Omega_j^{(N)}$, j=1, . . . , 0, of virtual loudspeaker signals, which are targeted to be uniformly distributed on the unit sphere, and sub-dividing them into said desired number I of groups, $\mathcal{G}_i$, i=1, . . . , I of neighbouring directions;

linearly combining mode vectors $$S_n:=[S_0^0(\Omega_n^{(N)})S_1^{-1}(\Omega_n^{(N)})S_1^0(\Omega_n^{(N)})S_1^1(\Omega_n^{(N)}) \ldots S_N^{N-1}(\Omega_n^{(N)})S_N^N(\Omega_n^{(N)})]^T\in\mathbb{R}^O$$

for said directions $\Omega_j^{(N)}$ within each group $\mathcal{G}_i$, resulting in vectors $V_i=\Sigma_{n\in\mathcal{G}_i}\alpha_n s_n\in\mathbb{R}^O$, where $\alpha_n\geq 0$ denotes a weight of $S_n$ for said combining;

constructing from said vectors $V_1$ a matrix $V:=K\cdot[V_1 V_2 \ldots V_I]\in\mathbb{R}^{O\times I}$ with an arbitrary positive real-valued scaling factor K>0;

calculating from said matrix V a matrix $V^+$ which is the Moore-Penrose pseudoinverse of matrix V;

computing for a current section of c(t) said mezzanine HOA representation $w_{MEZZ}(t)$ by $w_{MEZZ}(t)$ VC(t), or, at decoding side, for generating, from a mezzanine HOA signal representation $w_{MEZZ}(t)$ that was generated like above, a reconstructed HOA signal representation $\hat{c}(t)$ of a sound field having an order of N and a number $O=(N+1)^2$ of coefficient sequences, said method including:

computing a reconstructed version of said HOA signal representation $\hat{c}(t)$ by $\hat{c}(t)=V\cdot w_{MEZZ}(t)$.

In principle, the apparatus is adapted for generating, from an HOA signal representation c(t) of a sound field having an order of N and a number $O=(N+1)^2$ of coefficient sequences, a mezzanine HOA signal representation $w_{MEZZ}(t)$ consisting of an arbitrary number I<O of virtual loudspeaker signals $w_{MEZZ,1}(t)$, $w_{MEZZ,2}(t)$, . . . , $w_{MEZZ,I}(t)$, said apparatus including means adapted to:

determine a desired number I of virtual loudspeaker signals in said mezzanine HOA signal representation with I<O;

take O directions $\Omega_j^{(N)}$, j=1, . . . , O, of virtual loudspeaker signals, which are targeted to be uniformly distributed on the unit sphere, and sub-divide them into said desired number I of groups $\mathcal{G}_i$, i=1, . . . ,I of neighbouring directions;

linearly combine mode vectors $$S_n:=[S_0^0(\Omega_n^{(N)})S_1^{-1}(\Omega_n^{(N)})S_1^0(\Omega_n^{(N)})S_1^1(\Omega_n^{(N)}) \ldots S_N^{N-1}(\Omega_n^{(N)})S_N^N(\Omega_n^{(N)})]^T\in\mathbb{R}^O$$

for said directions $\Omega_j^{(N)}$ within each group $\mathcal{G}$, resulting in vectors $V_i=\Sigma_{n\in\mathcal{G}_i}\alpha_n S_n\in\mathbb{R}^O$, where $\alpha_n\geq 0$ denotes a weight of $S_n$ for said combining;

construct from said vectors $V_i$ a matrix $V:=K\cdot[V_1 V_2 \ldots V_I]\in\mathbb{R}^{O\times I}$ with an arbitrary positive real-valued scaling factor K>0;

calculate from said matrix V a matrix $V^+$ which is the Moore-Penrose pseudoinverse of matrix V;

compute for a current section of c(t) said mezzanine HOA representation $w_{MEZZ}(t)$ by $w_{MEZZ}(t)=V^+\cdot c(t)$, or, at decoder side, for generating, from a mezzanine HOA signal representation $w_{MEZZ}(t)$ that was generated like above, a reconstructed HOA signal representation $\hat{c}(t)$ of a sound field having an order of N and a number $O=(N+1)^2$ of coefficient sequences, said apparatus including means adapted to:

compute a reconstructed version of said HOA signal representation $\hat{c}(t)$ by $\hat{c}(t)=V\cdot w_{MEZZ}(t)$.

Aspects of the present invention relate to methods, apparatus, and computer programs for encoding an ambisonics signal representation of a sound field having an order N to determine a mezzanine ambisonics signal representation. A receiver and/or a processor receives a first multi-channel signal comprising a first number of channels O, wherein $O=(N+1)^2$. The O channels represent O HOA coefficient sequences. The ambisonics signal representation is represented by the first multi-channel signal. The receiver and/or processor further receives transforming information for encoding the first multi-channel signal of the ambisonics signal representation. The transforming information includes mapping information for mapping the O HOA coefficient sequences to O virtual loudspeaker signals. The transforming information further includes grouping information for grouping the O virtual loudspeaker signals to I groups of virtual loudspeaker signals. The processor transforms the first multi-channel signal to a second multi-channel signal based on the transforming information. The mezzanine ambisonics signal representation is represented by the second multi-channel signal. The second multi-channel signal comprises a second number of channels I. The I channels represent the I groups of virtual loudspeaker signals. The transforming information may include information regarding a decoding matrix V. The transforming information may include information regarding an encoding matrix V+ that is a pseudo inverse of the decoding matrix V. The grouping information may indicate groups of two virtual loudspeakers.

Aspects of the present invention relate to methods, apparatus, and computer programs for decoding a mezzanine ambisonics signal representation to determine a reconstructed ambisonics signal representation of a sound field having an order N. A processor and/or receiver receives a first multi-channel signal of the mezzanine ambisonics signal representation. The first multi-channel signal of the mezzanine ambisonics signal representation has a first number of channels I. The processor and/or receiver receives transforming information for decoding the first multi-channel signal of the mezzanine ambisonics signal representation. The transforming information includes de-grouping information for de-grouping I groups of virtual loudspeakers to O virtual loudspeakers. The transforming information further includes information for mapping O number of virtual loudspeakers to O sequences of HOA coefficient sequences that represent the reconstructed ambisonics signal representation. The processor transforms the first multi-channel signal to a second multi-channel signal based on the transforming information. The second multi-channel signal represents the reconstructed ambisonics signal representation. The second multi-channel signal comprises O number of channels, and wherein $O=(N+1)^2$. The transforming information includes information regarding an encoding matrix V+. The transforming information includes information regarding a decoding matrix V that is a pseudo inverse of the encoding matrix V+. The de-grouping information indicates groups of two virtual loudspeakers.

BRIEF DESCRIPTION OF DRAWINGS

Exemplary embodiments of the invention are described with reference to the accompanying drawings, which show in.

DESCRIPTION OF EMBODIMENTS

Figure 1:
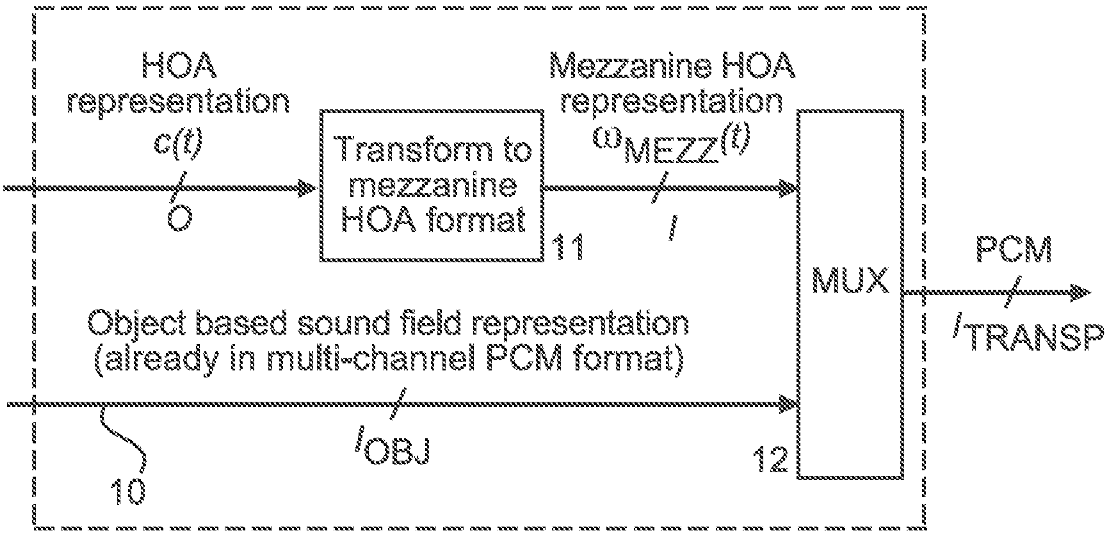
FIG. 1 illustrates an exemplary conversion of a combination of object based and HOA sound field representations to a multi-channel PCM format.
Figure 2:
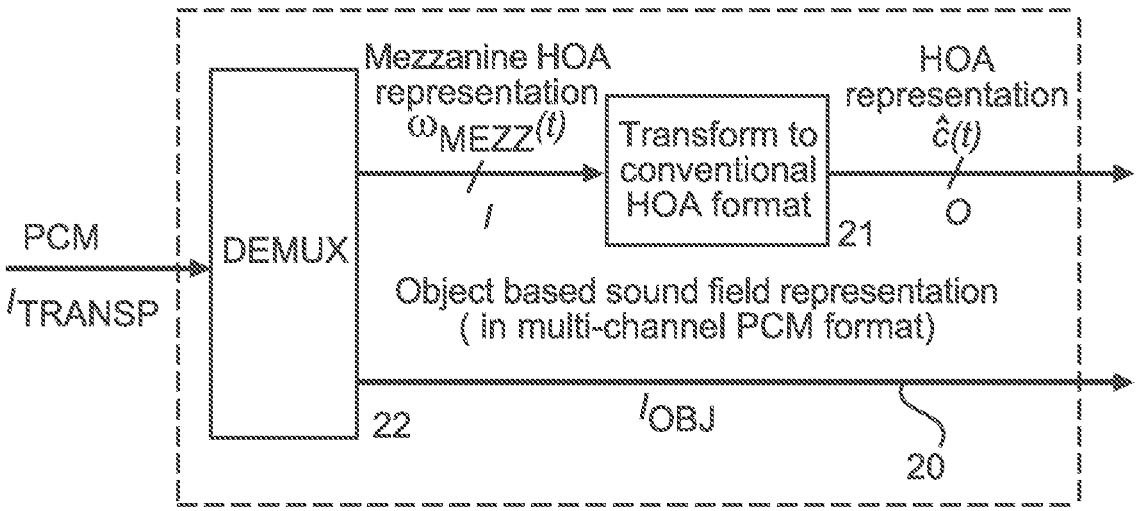
FIG. 2 illustrates an exemplary reconstruction of a combination of object based and HOA sound field representations from a multi-channel PCM format.

Even if not explicitly described, the following embodiments may be employed in any combination or sub-combination.

In the following a mezzanine HOA format is described that is computed by a modified spatial transform of a conventional HOA representation consisting of O coefficient sequences to an arbitrary and non-quadratic number I of virtual loudspeaker signals.

Without loss of generality, it is further assumed in the following that $I<O$, since for the opposite case it is always possible to artificially extend the number of coefficient sequences of the original HOA representation by appending an appropriate number of zero coefficient sequences.

A first optional step is to reduce the order N of the original HOA representation to a smaller order $N_R$ such that the resulting number $O_R=(N_R+1)^2$ of coefficient sequences is the next upper square integer number to the desired number I of virtual loudspeaker signals, i.e. the reduced number $O_R$ of coefficient sequences is the smallest integer number square that is greater than the number I. The rationale behind this step is the fact that is not reasonable to represent an HOA representation of an order greater than $N_R$ by a number $I<O_R$ of virtual loudspeaker signals, of which the directions cover the sphere as uniformly as possible. This means that in the following the transform of a conventional HOA representation consisting of $O_R$ (rather than O) coefficient sequences to an arbitrary number I of virtual loudspeaker signals is considered. Nevertheless, it is also possible to set $O_R=O$ and to ignore this optional order reduction.

In case this first optional step is not carried out, in the following $N_R$ is replaced by N, $O_R$ by O, $c_R(t)$ by c(t), $S_{n,R}$ by $S_n$, $\Psi_R$ by $\Psi$, $\Psi_R^{-1}$ by $\Psi^{-1}$, and $w_R(t)$ by w(t).

The next step is to consider the conventional spatial transform for an HOA representation of order $N_R$ (described in section Spatial transform), and to sub-divide the virtual speaker directions $\Omega_j^{(N_R)}$, $1\le j\le O_R$ into the desired number I of groups of neighbouring directions. The grouping is motivated by a spatially selective reduction of spatial resolution, which means that the grouped virtual loudspeaker signals are meant to be replaced by a single one. The effect of this replacement on the sound field is explained in section Illustration of grouping effect. The grouping can be expressed by I sets $\mathcal{G}$, i=1 . . . , I, which contain the indices of the virtual directions grouped into the i-th group.

Subsequently, the mode vectors $$S_{n,R}:=[S_0^0(\Omega_n^{(NR)})S_1^{-1}(\Omega_n^{(NR)})S_1^0(\Omega_n^{(NR)})S_1^1(\Omega_n^{(NR)}) \ldots S_N^{N-1}(\Omega_n^{(NR)})S_{N_R}^{NR}(\Omega_n^{(NR)})]^T \in \mathbb{R}^{O_R} \quad (3)$$

for directions $\Omega_n^{(N_R)}$ within each group are linearly combined resulting in the vectors $$V_i = \Sigma_{n \in \mathcal{G}_i} \alpha_n S_{n,R} \in \mathbb{R}^{O_R}, \quad (7)$$

where $\alpha_n \geq 0$ denotes the weight of $S_{n,R}$ for the combination. The choice of the weights is addressed in more detail in the following section Choice of the weights for combination of mode vectors.

The vectors $V_i$ are finally used to construct the matrix $$V := K \cdot [V_1 V_2 \ldots V_I] \in \mathbb{R}^{O_R \times I} \quad (8)$$

with an arbitrary positive real-valued scaling factor K>0 to replace the scaled mode matrix Ψ used for the conventional spatial transform.

The mezzanine HOA representation $w_{MEZZ}(t)$ is then computed from the order reduced HOA representation, denoted by $c_R(t)$, through $$w_{MEZZ}(t) = V^+ \cdot c_R(t) \quad (9)$$

with $(\bullet)^+$ indicating the Moore-Penrose pseudoinverse of a matrix.

The inverse transform for computing a recovered conventional HOA representation $\hat{c}_R(t)$ of order $N_R$ from the mezzanine HOA representation is given by $$\hat{c}_R(t) = V \cdot w_{MEZZ}(t). \quad (10)$$

An N-th order HOA representation c(t) can be recovered by zero-padding $c_R(t)$ according to $$c(t) = \begin{bmatrix} c_R(t) \\ 0 \end{bmatrix}, \quad (11)$$

where O denotes a zero vector of dimension $O - O_R$.

Note that, in general, the transform is not lossless such that $\hat{c}(t) \neq c(t)$. This is due to the order reduction on one hand, and the fact that the rank of the transform matrix V is I at most on the other hand. The latter can be expressed by a spatially selective reduction of spatial resolution resulting from the grouping of virtual speaker directions, which will be illustrated in the next section.

A somewhat different computation of the mezzanine HOA representation compared to equation (9) is obtained by expressing matrix V by $$V = \Psi_R \cdot A, \quad (12)$$

where $\Psi_R$ denotes the mode matrix of the reduced order $N_R$ with respect to the directions $\Omega_j^{(N_R)}$, $1 \leq j \leq O_R$, and where $A \in \mathbb{R}_0$ is a weighting factor matrix, whose elements $a_{i,n}$ can be expressed in dependence on the weights $\alpha_n$, n=1, . . . , $O_R$, by $$\alpha_{i,n} = \begin{cases} \alpha_n & \text{if the } n\text{-}th \text{ direction is grouped into group } \mathcal{G}_i \\ 0 & \text{else} \end{cases}. \quad (13)$$

The alternative mezzanine HOA representation can then be computed from the order reduced HOA representation $c_R(t)$ by $$w_{MEZZ,ALT}(t) = A^+ \cdot \Psi_R^{-1} c_R(t), \quad (14)$$

with the inverse transform being equivalent to equation (10), i.e.

$$c_{R,ALT}(t) = V \cdot w_{MEZZ,ALT}(t). \quad (15)$$

By expressing equation (14) as $$w_{MEZZ,ALT}(t) = A^+ \cdot w_R(t), \quad (16)$$

where $$w_R(t) = \Psi_R^{-1} \cdot c_R(t), \quad (17)$$

it can be seen that the virtual loudspeakers $w_{MEZZ,ALT}(t)$ of this alternative transform are computed by a linear combination of the virtual loudspeaker signals $w_R(t)$ of the conventional spatial transform. Finally, it should be noted that the mezzanine HOA representation $w_{MEZZ}(t)$ is optimal in the sense that the corresponding recovered conventional HOA representation $c_R(t)$ has the smallest error (measured by the Euclidean norm) to the order-reduced original HOA representation $c_R(t)$. Hence, it should be the preferred choice to keep the losses during the transform as small as possible. The alternative mezzanine HOA representation $w_{MEZZ,ALT}(t)$ has the property of best approximating (measured by the Euclidean norm) the virtual loudspeaker signals $w_R(t)$ of the conventional spatial transform.

In practice, it is possible to pre-compute the matrices V and corresponding matrices $V^+$ (or, for the alternative embodiment processing, the matrices $A^+$ and $\Psi_R^{-1}$, or their product $A^+ \cdot \Psi_R^{-1}$) for different desired numbers I of virtual loudspeaker signals and for corresponding reduced orders $N_R$ of input HOA representations. Storing the resulting matrices V within an inverse transform processing unit and storing the resulting matrices $V^+$ (or for the alternative processing the matrices $A^+$ and $\Psi_R^{-1}$, or their product $A^+ \cdot \Psi_R^{-1}$) within the transform processing unit, will define the behaviour of the transform processing unit and the inverse transform processing unit for different desired numbers I of virtual loudspeaker signals and corresponding reduced orders $N_R$ of input HOA representations.

Choice of the Weights for Combination of Mode Vectors

The weights can be used for controlling the reduction of the spatial resolution in the region covered by the directions $\Omega_n^{(N_R)}$ of the i-th group, i.e. for $n \in \mathcal{G}_i$. In particular, a greater weight $\alpha_n$, compared to other weights in the same group, can be applied to ensure that the resolution in the neighbourhood of the direction $\Omega_n^{(N_R)}$ is not affected as much as in the neighbourhood of the other directions in the same group. Setting an individual weight $\alpha_n$ to a low value (or even to zero) has the effect of attenuating (or even removing) contributions to the resulting sound field from general plane waves with directions of incidence in the neighbourhood of direction $\Omega_n^{(N_R)}$.

An exemplary reasonable choice for the weights is $$\alpha_n = 1 \ \forall n \in \mathcal{G}_i, \quad (18)$$

where all mode vectors are combined equally. With this choice the spatial resolution is reduced uniformly over the neighbourhood of the directions $\Omega_n^{(N_R)}$ of the i-th group, i.e. for $n \in \mathcal{G}_i$. Further, the created virtual loudspeaker signals $w_{MEZZ,i}(t)$ will have approximately the same value range as the average of the replaced virtual loudspeaker signals $w_n(t)$, $n \in \mathcal{G}_i$. Hence, assuming that the original HOA representation is normalised such that virtual loudspeaker signals resulting from the conventional spatial transform lie in the same value range of [−1,1[, this choice of the weights is the preferred one for the transmission of HOA representations over SDI.

An alternative exemplary choice is $$\alpha_n = \frac{1}{|\mathcal{G}_i|} \quad \forall\, n \in \mathcal{G}_i, \tag{19}$$

where |•| denotes the cardinality of a set. In this case, the spatial blurring is the same as with equation (18). However, the value range of the created virtual loudspeaker signals is approximately equal to that of the sum of the replaced virtual loudspeaker signals.

Illustration of Grouping Effect

To understand the effects of the proposed modified spatial transform, it is reasonable to first understand the conventional spatial transform.

For HOA the sound pressure p(t,x) at time t and position x in a sound source free listening area can be represented by a superposition of an infinite number of general plane waves arriving from all possible directions $\Omega=(\theta,\phi)$, i.e.

$$p(t,x)=\int_{\mathcal{S}^2} p_{GPW}(t,x,\Omega)d\Omega \tag{20}$$

where $\mathcal{S}^2$ indicates the unit sphere in the three-dimensional space and $p_{GPW}(t,x,\Omega)$ denotes the contribution of the general plane wave from direction Ω to the pressure at time t and position x. The time and direction dependent function $$c(t,\Omega)=p_{GPW}(t,x,\Omega)|_{x=x_{ORIG}} \tag{21}$$

represents the contribution of each general plane wave to the sound pressure in the coordinate origin $x_{ORIG}=(000)^T$. This function is expanded into a series of Spherical Harmonics for each time instant t according to $$c(t,\Omega=(\theta,\phi))=\Sigma_{n=0}^{N}\Sigma_{m=-n}^{n}c_n^m(t)S_n^m(\theta,\phi), \tag{22}$$

wherein the conventional HOA coefficient sequences $c_n^m(t)$ are the weights of the expansion, regarded as functions over time t. Assuming an infinite order of the expansion (22), the function c(t, Ω) for a single general plane wave y(t) from direction $\Omega_0$ can be factored into a time dependent and a direction dependent component according to $$c(t,\Omega)=y(t)\cdot\delta(\Omega-\Omega_0) \text{ for } N\rightarrow\infty, \tag{23}$$

where δ(•) denotes the Dirac delta function. The corresponding HOA coefficient sequences are given by $$c_n^m(t) = \frac{1}{4\pi}\cdot\int_{S^2} c(t,\Omega)S_n^m(\theta,\phi)d\Omega \tag{24}$$

$$= y(t)\cdot\frac{1}{4\pi}\cdot S_n^m(\theta_0,\phi_0) \tag{25}$$

The truncation of the expansion (22) to a finite order N, however, introduces a spatial dispersion on the direction dependent component. This can be seen by plugging the expression (25) for the HOA coefficients into the expansion (22), resulting in $$c(t,(\theta,\phi)) = y(t)\cdot\frac{1}{4\pi}\cdot\sum_{n=0}^{N}\sum_{m=-n}^{n}S_n^m(\theta_0,\phi_0)S_n^m(\theta,\phi) \tag{26}$$

for a finite order N. It can be shown (see [9]) that equation (26) can be simplified to $$c(t,(\theta,\phi)) = y(t)\cdot\xi_N(\Theta) \tag{27}$$

$$\text{with } \xi_N(\Theta) := \frac{N+1}{4\pi(\cos\Theta-1)}(P_{N+1}(\cos\theta)-P_N(\cos\Theta)), \tag{28}$$

wherein Θ denotes the angle between the two vectors pointing towards the directions Ω and $\Omega_0$.

Figure 3:
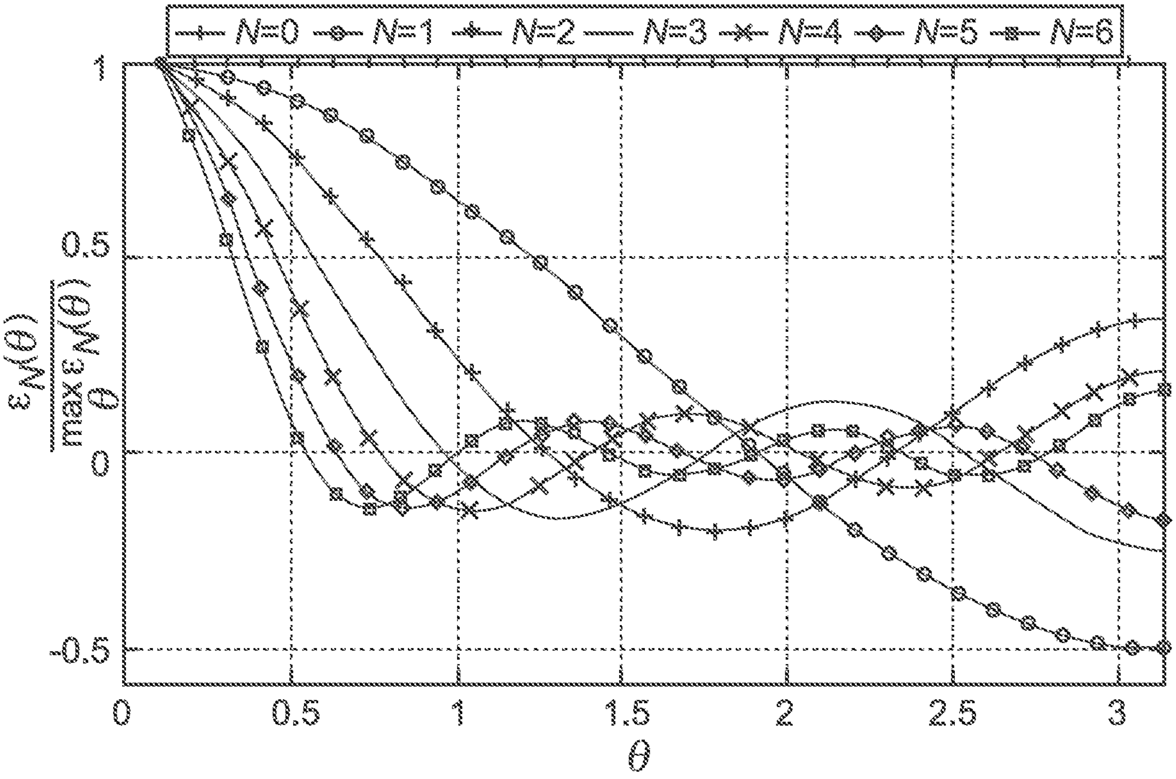
FIG. 3 illustrates an exemplary normalized dispersion function $\xi_N(\Theta)$ for different Ambisonics orders N and for angles $\Theta\in[0,\pi]$.

Now, the directional dispersion effect becomes obvious by comparing the case for an infinite order shown in equation (23) with the case for a finite order expressed by equation (27). It can be seen that for the latter case the Dirac delta function is replaced by the dispersion function $\xi_N(\Theta)$, which is illustrated in FIG. 3 after having been normalised by its maximum value for different Ambisonics orders N, whereby the vertical scale is $$\frac{\xi_N(\Theta)}{\max\limits_{\Theta}\xi_N(\Theta)}$$

and the horizontal scale is Θ. In this context, dispersion means that a general plane wave is replaced by infinitely many general plane waves, of which the amplitudes are modelled by the dispersion function $\xi_N(\Theta)$.

Because the first zero of $\xi_N(\Theta)$ is located approximately at $$\frac{\pi}{N}$$

for N≥4 (see [9]), the dispersion effect is reduced (and thus the spatial resolution is improved) with increasing Ambisonics order N. For N→∞ the dispersion function $\xi_N(\Theta)$ converges to the Dirac delta function.

Having the dispersion effect in mind, the conventional spatial transform is considered again and the relation (5) between the conventional HOA coefficient sequences and the virtual loudspeaker signals is reformulated using below equation (35) and equations (1), (2) and (3) to $$c_n^m(t)=\Sigma_{j=1}^{O}K\cdot S_n^m(\Omega_j^{(N)})\cdot w_j(t). \tag{29}$$

It appears that the contribution due to each j-th virtual loudspeaker has the same form as in expression (25) with $$K = \frac{1}{4\pi}.$$

That actually means that the virtual loudspeaker signals have to be interpreted as directionally dispersed general plane wave signals.

Figure 4:
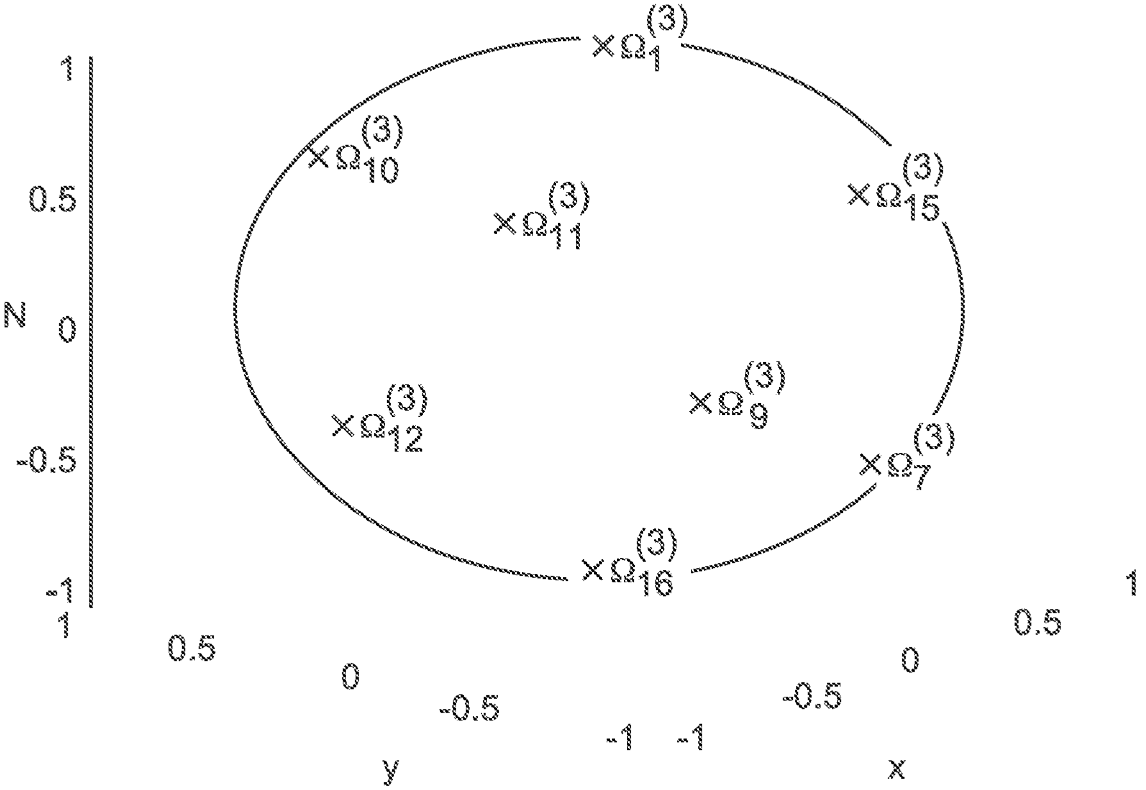
FIG. 4 depicts an exemplary illustration of directions $\Omega_j^{(N)}$, $1\le j\le O$ for N=3 (computed according to [3]) presented in a three-dimensional coordinate system as sampling positions (drawn as crosses) on the unit sphere, where only those directions that are visible from the given viewpoint are shown.

To illustrate this, the conventional spatial transform for a third order HOA representation (i.e. for N=3) is considered, where the directions for the virtual loudspeakers $\Omega_j^{(N)}$, 1≤j≤O (computed according to [3]) are depicted in FIG. 4.

Figure 5:
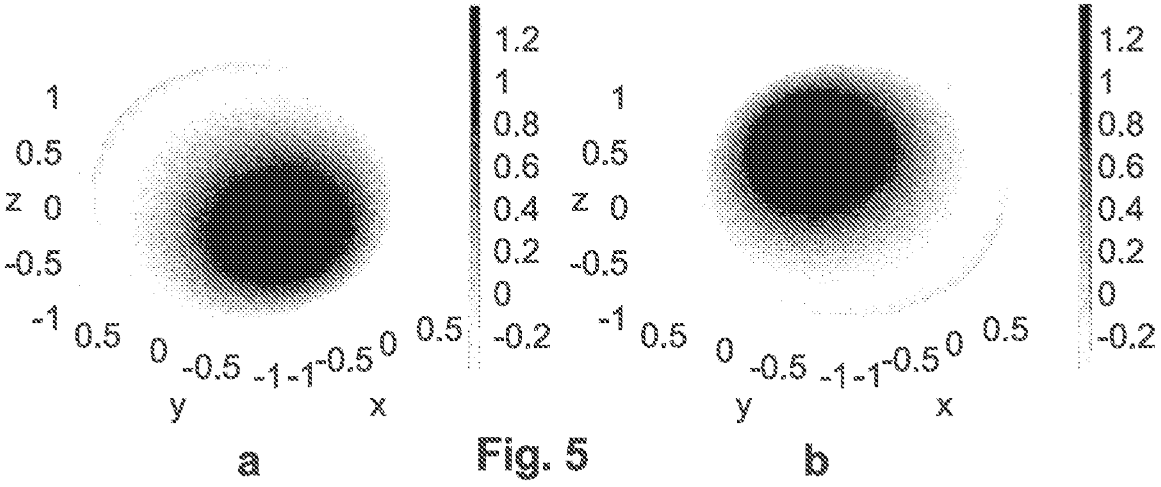
FIG. 5 illustrates exemplary dispersion functions $\xi_N(\Theta)$ for 9-th and 11-th virtual loudspeaker signal computed according to the conventional spatial transform using directions $\Omega_j^{(3)}$, $1<j<16$ computed according to [3]. The values of the dispersion function are coded into the shading of the sphere, where high values are shaded into dark grey to black and low values into light grey to white.
Figure 6:
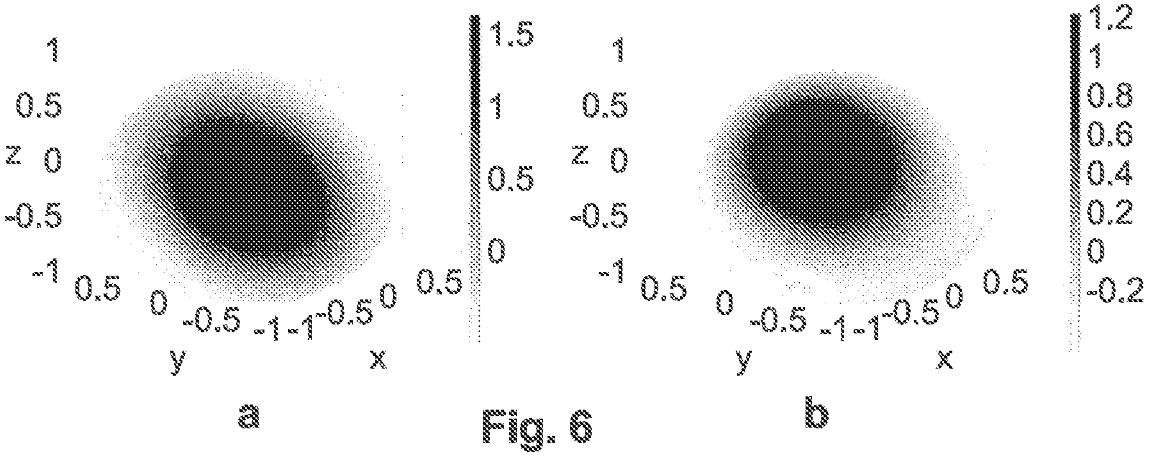
FIG. 6 illustrates exemplary dispersion functions resulting from the combination of the mode vectors for 9-th and 11-th virtual loudspeaker directions computed according to the conventional spatial transform using directions $\Omega_j^{(3)}$, $1<j<16$ computed according to [3]. The values of the dispersion function are coded into the shading of the sphere, where high values are shaded into dark grey to black and low values into light grey to white.

In FIG. 5 exemplarily shows the dispersion functions for the 9-th and 11-th virtual loudspeaker signal in FIG. 5*a* and FIG. 5*b*, respectively. To further illustrate the effect of virtual directions grouping for the modified spatial transform, it is assumed that the corresponding directions $\Omega_9^{(3)}$ and $\Omega_{11}^{(3)}$ have been grouped together. The direction-dependent dispersion of the contribution of the resulting virtual loudspeaker signal is shown for two different choices of weights in FIG. 6 in order to exemplarily demonstrate the effect of the weighting.

For FIG. 6*a* an equal weighting of $\alpha_9=\alpha_{11}=1$ is assumed, such that the resulting dispersion function is a pure sum of the dispersion functions for the 9-th and 11-th virtual loudspeaker signal. In FIG. 6*b* the weighting for the dispersion function for the 9-th virtual loudspeaker is reduced to $\alpha_9=0.3$, resulting in a more concentrated dispersion function and making its maximum move closer to the direction $\Omega_{11}^{(3)}$.

Basics of Higher Order Ambisonics

Figure 7:
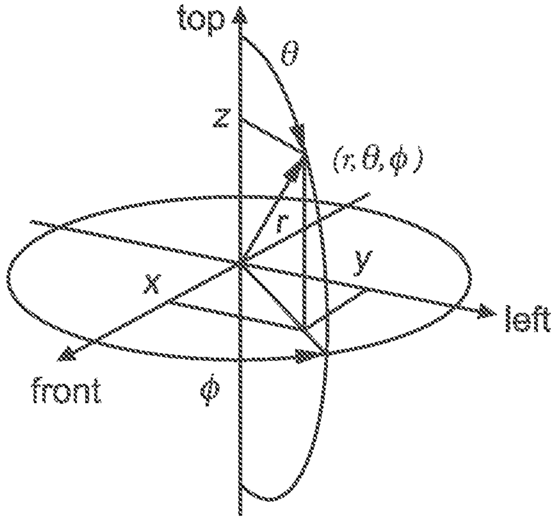
FIG. 7 illustrates an exemplary spherical coordinate system.

Higher Order Ambisonics (HOA) is based on the description of a sound field within a compact spatial area of interest, which is assumed to be free of sound sources. The spatio-temporal behaviour of the sound pressure p(t,x) at time t and position x within the spatial area of interest is physically fully determined by the homogeneous wave equation. In the following, a spherical coordinate system is assumed as shown in FIG. 7. In this coordinate system the x axis points to the frontal position, the y axis points to the left, and the z axis points to the top. A position in space $x=(r,\theta,\phi)^T$ is represented by a radius r≥0 (i.e. the distance to the coordinate origin), an inclination angle $\theta\in[0,\pi]$ measured from the polar axis z and an azimuth angle $\phi\in[0,2\pi]$ measured counter-clockwise in the x-y plane from the x axis. Further, $(\bullet)^T$ denotes a transposition.

It can be shown (see [10]) that the Fourier transform of the sound pressure with respect to time denoted by $\mathcal{F}_t(\bullet)$, i.e.

$$P(\omega,x)=\mathcal{F}_t(p(t,x))=\int_{-\infty}^{\infty}p(t,x)e^{-i\omega t}dt \tag{30}$$

with ω denoting the angular frequency and i indicating the imaginary unit, can be expanded into a series of Spherical Harmonics according to $$P(\omega=kc_s,r,\theta,\phi)=\sum_{n=0}^{N}\sum_{m=-n}^{n}A_n^m(k)j_n(kr)S_n^m(\theta,\phi). \tag{31}$$

In equation (31), $c_s$ denotes the speed of sound and k denotes the angular wave number, which is related to the angular frequency ω by $$k=\frac{\omega}{c_s}.$$

Further, $j_n(\bullet)$ denote the spherical Bessel functions of the first kind and $S_n^m(\theta,\phi)$ denote the real valued Spherical Harmonics of order n and degree m, which are defined in below section Definition of real valued Spherical Harmonics. The expansion coefficients $A_n^m(k)$ depend only on the angular wave number k. Note that it has been implicitly assumed that sound pressure is spatially band-limited. Thus the series is truncated with respect to the order index n at an upper limit N, which is called the order of the HOA representation.

Because the spatial area of interest is assumed to be free of sound sources, the sound field can be represented by a superposition of an infinite number of general plane waves arriving from all possible directions $\Omega=(\theta,\phi)$, i.e.

$$p(t,X)=\int_{\mathcal{S}^2}p_{GPW}(t,x,\Omega)d\Omega, \tag{32}$$

where $\mathcal{S}^2$ indicates the unit sphere in the three-dimensional space and $p_{GPW}(t, x, \Omega)$ denotes the contribution of the general plane wave from direction Ω to the pressure at time t and position x. Evaluating the contribution of each general plane wave to the pressure in the coordinate origin $x_{ORIG}=(000)^T$ provides a time and direction dependent function $$c(t,\Omega)=p_{GPW}(t,x,\Omega)|_{x=x_{ORIG}}, \tag{33}$$

which is then for each time instant expanded into a series of Spherical Harmonics according to $$c(t,\Omega=(\theta,\phi))=\sum_{n=0}^{N}\sum_{m=-n}^{n}c_n^m(t)S_n^m(\theta,\phi). \tag{34}$$

The weights $c_n^m(t)$ of the expansion, regarded as functions over time t, are referred to as continuous-time HOA coefficient sequences and can be shown to always be real-valued. Collected in a single vector c(t) according to $$c(t)=[c_0^0(t)c_1^{-1}(t)c_1^0(t)c_1^1(t)c_2^{-2}(t)c_2^{-1}(t)c_2^0(t)c_2^1(t)\,c_2^2(t)\ldots c_N^{N-1}(t)c_N^N(t)]^T, \tag{35}$$

they constitute the actual HOA sound field representation. The position index of an HOA coefficient sequence $c_n^m(t)$ within the vector c(t) is given by n(n+1)+1+m. The overall number of elements in the vector c(t) is given by $O=(N+1)^2$.

The knowledge of the continuous-time HOA coefficient sequences is theoretically sufficient for perfect reconstruction of the sound pressure within the spatial area of interest, since it can be shown that their Fourier transforms with respect to time, i.e. $C_n^m(\omega)=\mathcal{F}(c_n^m(t))$, are related to the expansion coefficients $A_n^m(k)$ (from equation (31)) by $$A_n^m(k)=i^nC_n^m=kc_s). \tag{36}$$

Definition of Real Valued Spherical Harmonics

The real-valued spherical harmonics $S_n^m(\theta,\phi)$ (assuming SN3D normalisation (see chapter 3.1 in [2]) are given by $$S_n^m(\theta,\phi)=\sqrt{(2n+1)\frac{(n-|m|)!}{(n+|m|)!}}\,P_{n,|m|}(\cos\theta)trg_m(\phi) \tag{37}$$

$$\text{with } trg_m(\phi)=\begin{cases}\sqrt{2}\cos(m\phi) & m>0\\ 1 & m=0\\ -\sqrt{2}\sin(m\phi) & m<0\\ \vdots & \vdots\end{cases}. \tag{38}$$

The associated Legendre functions $P_{n,m}(x)$ are defined as $$P_{n,m}(x)=(1-x^2)^{\frac{m}{2}}\frac{d^m}{dx^m}P_n(x),\ m\geq 0 \tag{39}$$

with the Legendre polynomial $P_n(x)$ and, unlike in [10], without the Condon-Shortley phase term $(-1)^m$.

There are also alternative definitions of 'spherical harmonics'. In such case the transformation described is also valid.

The described processing can be carried out by a single processor or electronic circuit, or by several processors or electronic circuits operating in parallel and/or operating on different parts of the complete processing.

The instructions for operating the processor or the processors according to the described processing can be stored in one or more memories. The at least one processor is configured to carry out these instructions.

REFERENCES

[1] ISO/IEC JTC1/SC29/WG11 DIS 23008-3, "Information technology—High efficiency coding and media delivery in heterogeneous environments—Part 3: 3D Audio", July 2014

[2] J. Daniel, "Représentation de champs acoustiques, application à la transmission et à la reproduction de scènes sonores complexes dans un contexte multimédia", PhD thesis, Université Paris 6, 2001

[3] J. Fliege, U. Maier, "A two-stage approach for computing cubature formulae for the sphere", Technical report, Section Mathematics, University of Dortmund, 1999. Node numbers are found at http://www.mathematik.uni-dortmund.de/lsx/research/projects/fliege/nodes/nodes.html

[4] EP 2469742 A2

[5] PCT/EP2015/063912

[6] WO 2014/090660 A1

[7] WO 2014/177455 A1

[8] WO 2013/171083 A1

[9] B. Rafaely, "Plane-wave decomposition of the sound field on a sphere by spherical convolution", J. Acoust. Soc. Am., 4(116), pages 2149-2157, October 2004

[10] E. G. Williams, "Fourier Acoustics", Applied Mathematical Sciences, vol. 93, 1999, Academic Press

What is claimed is:

1. A method for encoding an ambisonics signal representation of a sound field having an order N to determine a mezzanine ambisonics signal representation, the method comprising:

receiving, by a processor configured to encode the ambisonics signal representation, a first multi-channel signal comprising first channels O, wherein O=(N+1)^2, wherein the O channels correspond to O Higher Order Ambisonics (HOA) coefficient sequences, and wherein the ambisonics signal representation is represented by the first multi-channel signal;

receiving, by the processor, transforming information for encoding the first multi-channel signal of the ambisonics signal representation, wherein the transforming information includes a matrix comprising mapping information for mapping the O HOA coefficient sequences to O virtual loudspeaker signals; and transforming, by the processor, the first multi-channel signal to a second multi-channel signal based on the transforming information, wherein the mezzanine ambisonics signal representation is represented by the second multi-channel signal, and wherein the second multi-channel signal comprises a second number of channels I, and wherein the I channels represent I groups of virtual loudspeaker signals.

2. The method of claim 1, wherein the I groups comprising of two virtual loudspeakers per group.

3. A computer program product comprising a nontransitive storage medium, the computer program product including code that, when executed by the processor is configured to perform the method of claim 1.

4. An apparatus for encoding an ambisonics signal representation of a sound field having an order N to determine a mezzanine ambisonics signal representation, the apparatus comprising:

a first receiver configured to receive a first multi-channel signal comprising a first channels O, wherein O=(N+1)^2, wherein the O channels correspond to O Higher Order Ambisonics (HOA) coefficient sequences, and wherein the ambisonics signal representation is represented by the first multi-channel signal;

a second receiver configured to receive transforming information for transforming the first multi-channel signal of the first number of channels O to the mezzanine ambisonics signal representation, wherein the transforming information includes a matrix comprising mapping information for mapping the O HOA coefficient sequences to O virtual loudspeaker signals; and a processing unit configured to transform the first multi-channel signal to a second multi-channel signal based on the transforming information, wherein the mezzanine ambisonics signal representation is represented by the second multi-channel signal, and wherein the second multi-channel signal comprises a second number of channels I, and wherein the I channels represent I groups of virtual loudspeaker signals.

5. The apparatus of claim 4, wherein the I groups comprising of two virtual loudspeakers per group.

6. A method for decoding a mezzanine ambisonics signal representation to determine a reconstructed ambisonics signal representation of a sound field having an order N, the method comprising:

receiving, by a processor configured to decode the mezzanine ambisonics signal representation, a first multi-channel signal of the mezzanine ambisonics signal representation, the first multi-channel signal of the mezzanine ambisonics signal representation having a first number of channels I;

receiving, by the processor, transforming information for decoding the first multi-channel signal of the mezzanine ambisonics signal representation, wherein the transforming information includes matrix information for mapping O number of virtual loudspeakers to O sequences of Higher Order Ambisonics (HOA) coefficient sequences that represent the reconstructed ambisonics signal representation; and transforming, by the processor, the first multi-channel signal to a second multi-channel signal based in part on the transforming information, wherein the second multi-channel signal represents the reconstructed ambisonics signal representation, wherein the second multi-channel signal comprises O channels, wherein O=(N+1)^2, and wherein the transforming includes de-grouping the I channels to O de-grouped channels.

7. The method of claim 6, wherein the matrix information includes information regarding a decoding matrix V that is a pseudo inverse of an encoding matrix V+.

8. The method of claim 6, wherein the de-grouping includes de-grouping groups of two virtual loudspeakers.

9. A computer program product comprising a nontransitive storage medium, the computer program product including code that, when executed by the processor is configured to perform the method of claim 6.

10. An apparatus for decoding a mezzanine ambisonics signal representation to determine a reconstructed ambisonics signal representation of a sound field having an order N, the apparatus comprising:

a first receiver configured to receive a first multi-channel signal of the mezzanine ambisonics signal representation, the first multi-channel signal of the mezzanine ambisonics signal representation having a first number of channels I;

a second receiver configured to receive transforming information for decoding the first multi-channel signal of the mezzanine ambisonics signal representation, wherein the transforming information includes matrix information for mapping O number of virtual loudspeakers to O sequences of Higher Order Ambisonics (HOA) coefficient sequences that represent the reconstructed ambisonics signal representation; and a processing unit configured to transform the first multi-channel signal to a second multi-channel signal based in part on the transforming information, wherein the second multi-channel signal represents the reconstructed ambisonics signal representation, wherein the second multi-channel signal comprises O number of channels, wherein O=(N+1)^2, and wherein the transforming includes de-grouping the I channels to O de-grouped channels.

11. The apparatus of claim 10, wherein the matrix information includes information regarding a decoding matrix V that is pseudo inverse of an encoding matrix V+.

12. The apparatus of claim 10, wherein the de-grouping includes de-grouping groups of two virtual loudspeakers.

* * * * *